Figure 1:
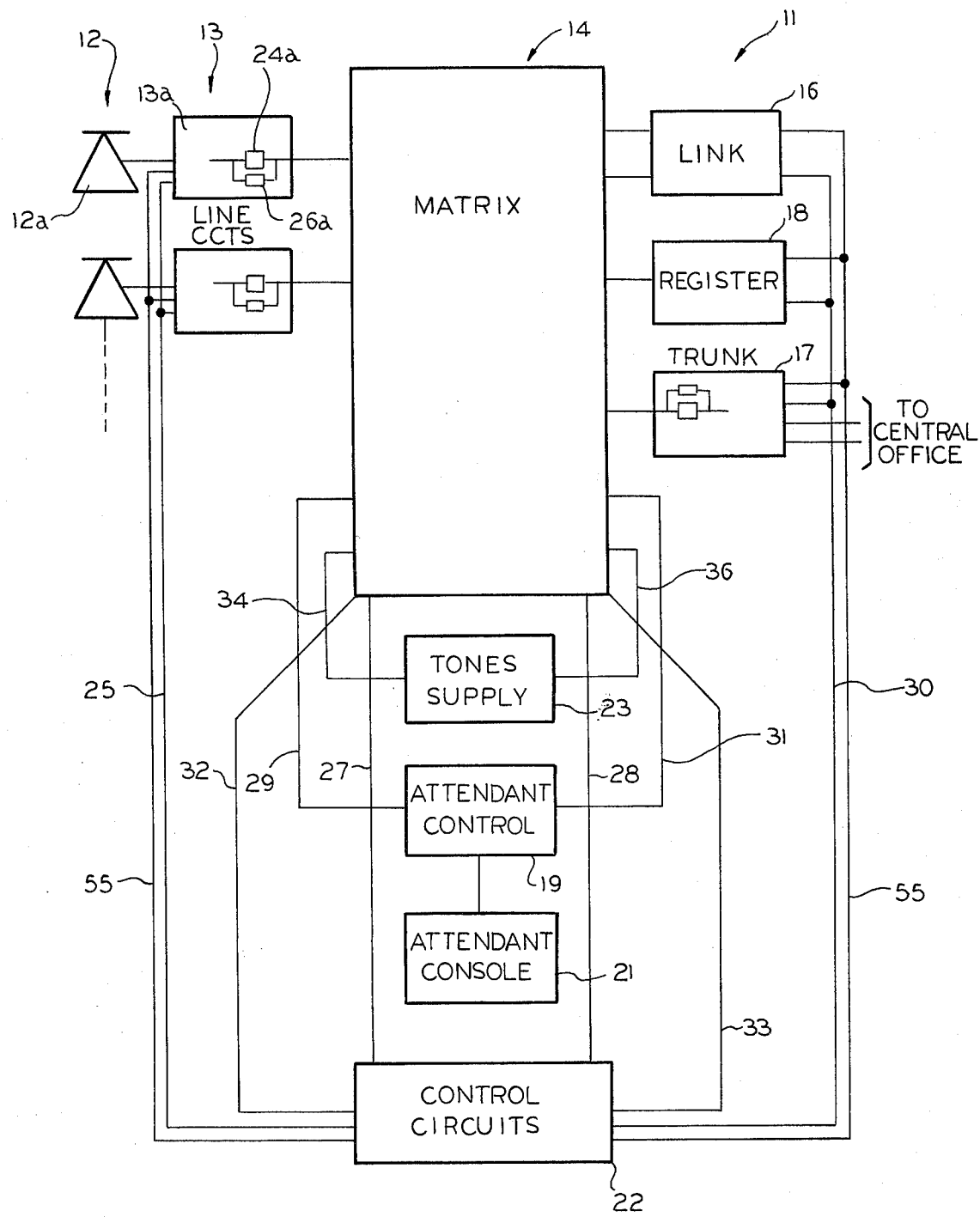

United States Patent [19]
Hestad

[11] 4,087,645
[45] May 2, 1978

[54] TELEPHONE SWITCHING SYSTEM

[76] Inventor: Alfred Magnus Hestad, 2518 N. Kilbourn, Chicago, Ill. 60639

[21] Appl. No.: 748,825

[22] Filed: Dec. 9, 1976

[51] Int. Cl.² .................................................. H04M 3/22
[52] U.S. Cl. .............................. 179/18 FA; 179/16 F
[58] Field of Search ........... 179/18 GE, 18 GF, 18 F, 179/18 FA, 16 F; 340/166 R, 166 EL, 174 M, 174 MA; 333/14

[56] References Cited

U.S. PATENT DOCUMENTS

| | | | |
|---|---|---|---|
| 3,213,391 | 10/1965 | Kovaleski et al. | 333/14 |
| 3,406,357 | 10/1968 | Garcia et al. | 333/14 |
| 3,892,925 | 7/1975 | Fisk et al. | 179/18 GF |
| 3,965,436 | 6/1976 | Dixon | 333/14 |

Primary Examiner—Thomas A. Robinson
Attorney, Agent, or Firm—Alter and Weiss

[57] ABSTRACT

A telephone switching system utilizing matrices composed of monolithic chips which include a plurality of cross points and controls therefor. The lines and trunks attached to the unique matrices include unique circuitry, such as two-way amplifiers, which compress the signals going into the matrices, but amplify the signals coming out of the matrices. The unique combination of the matrix signal amplitude compressing two-way amplifiers and monolithic chip matrices enables effective utilization of micro-processors for controlling the selection of paths through the matrix on a space division system.

13 Claims, 3 Drawing Figures

TELEPHONE SWITCHING SYSTEM

This invention relates to telephone switching systems; and more particularly, to line circuits, trunk circuits and unique matrices interconnecting the line and trunk circuits.

The telephone industry is constantly striving to improve telephone switching arrangements. In the search for a more economic and efficient telephone system, the switching matrices used in such systems are constantly upgraded. For example, with the advent of solid state cross points telephone systems were invented to efficiently use such cross points. The use of the solid state cross points, such as PNP transistors, was highlighted by two distinct types of control systems. One type of control system stressed the self seeking characteristic of the solid state cross points on space division systems. The other control system used computer type controls for processing the switching of the solid state cross points on a time division basis.

A relatively recent technical development has been micro-processors, which are excellent controls for the switching systems. With the advent of micro-processors the telephone industry has searched for switching matrices that could work most efficiently with the micro-processors and thereby provide complete efficient and cost effective telephone switching systems.

Monolithic chip switching matrices have been known in the art for some time. However, difficulties have arisen in attempting to utilize such monolithic chips in telephone circuitry. For example, telephony normally transmits over the lines at amplitudes in the range of up to plus 10 dBM. This range is much too high an amplitude to transmit through the readily commercially available monolithic chip type switching matrices.

Signals with high amplitude passing through the commercially available monolithic chip matrices with d-MOS transistor components are distorted. The distortion occurs because the series resistance of the d-MOS matrix increases proportionally to the amplitude of the signal. Thus, the positive peaks of the signal are attenuated more than the negative going peaks of the signal.

The use of step down transformers for reducing the amplitude of the signal going into the matrix has been attempted. However, the series resistance of each cross point in such a chip matrix is approximately 10 ohms; thus making it impractical to reduce the level of the signal going through the matrix using a step down transformer at the input and output of the matrix. The step down transformer in practice reduces the reflected impedance of the load, thereby increasing attenuation. The use of step down transformers thus has proven to be self defeating and impractical.

Accordingly, an object of the present invention is to provide line circuits and trunk circuits which include circuitry for lowering the amplitude of the signal going into the unique switching matrices, without adversely affecting the impedance match between the matrices and the circuits interconnected by the matrices.

Yet another object of the present invention is to provide amplifiers for compensating for the normal losses occurring during transmission of signals through telephone systems and at the same time for interconnecting line circuits and trunk circuits through chip matrices utilizing signal levels normally used in telephony.

Still another object of the present invention is to provide unique two-way amplifier and monolithic chip matrix arrangements wherein two-way amplifiers are used between the line circuits or trunk circuits, for example, and the monolithic chip matrices to lower the amplitude of the signals going into the switching matrices and to amplify the signals coming from the switching matrices to compensate for system losses.

Yet a more particular object of the present invention is to provide unique two-way amplifiers for use in connecting telephone stations or central offices to switching matrices wherein the two-way amplifiers use negative feedback circuits to lower the amplitude of the line circuit signals or the central office signals going to the switching matrices.

Another object of the present invention is to provide unique telephone switching systems utilizing switching arrays comprising monolithic chips having d-MOS enhancement mode transistors and controls included on a chip.

A related object of the present invention is to provide TDM telephone switching systems using d-MOS monolithic chips having certain controls right on the chip.

In a preferred embodiment of the present invention the switching matrices of a telephone system comprise arrays of d-MOS 8 × 2 monolithic enhancement mode transistors which have sub-controls thereon. Such switching equipment, for example, are provided commercially in the SIGNETICS SD 5301 8 × 2 analog/digital switching arrays.

The line circuits and the trunk circuits have amplifiers which use negative feedback, for lowering the amplitude of the signal going into the switching arrays and nonetheless amplify the signal coming out of the switching arrays. The system enables utilization of micro-processors for controlling the switching through the array.

Figure 2:
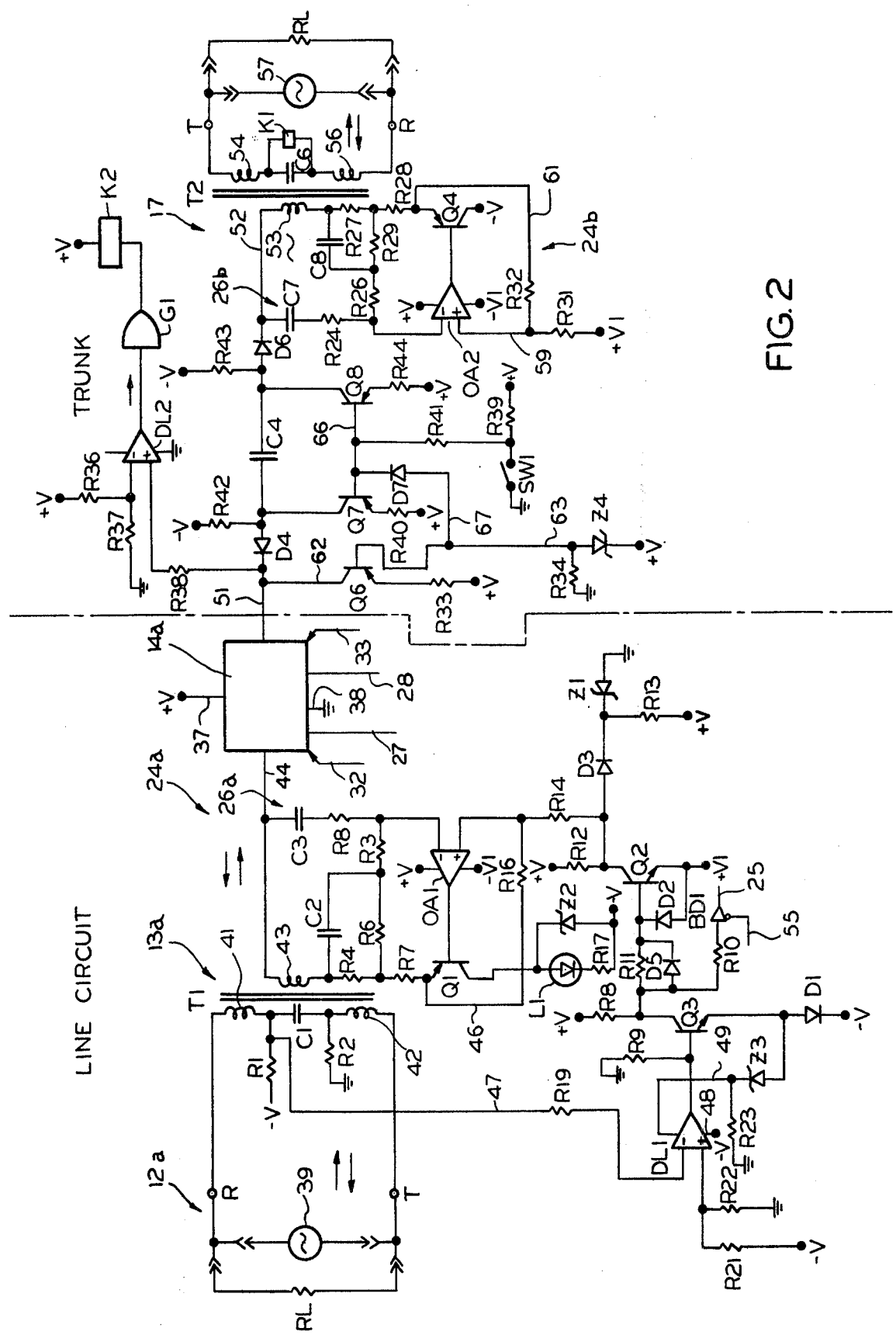
Figure 3:
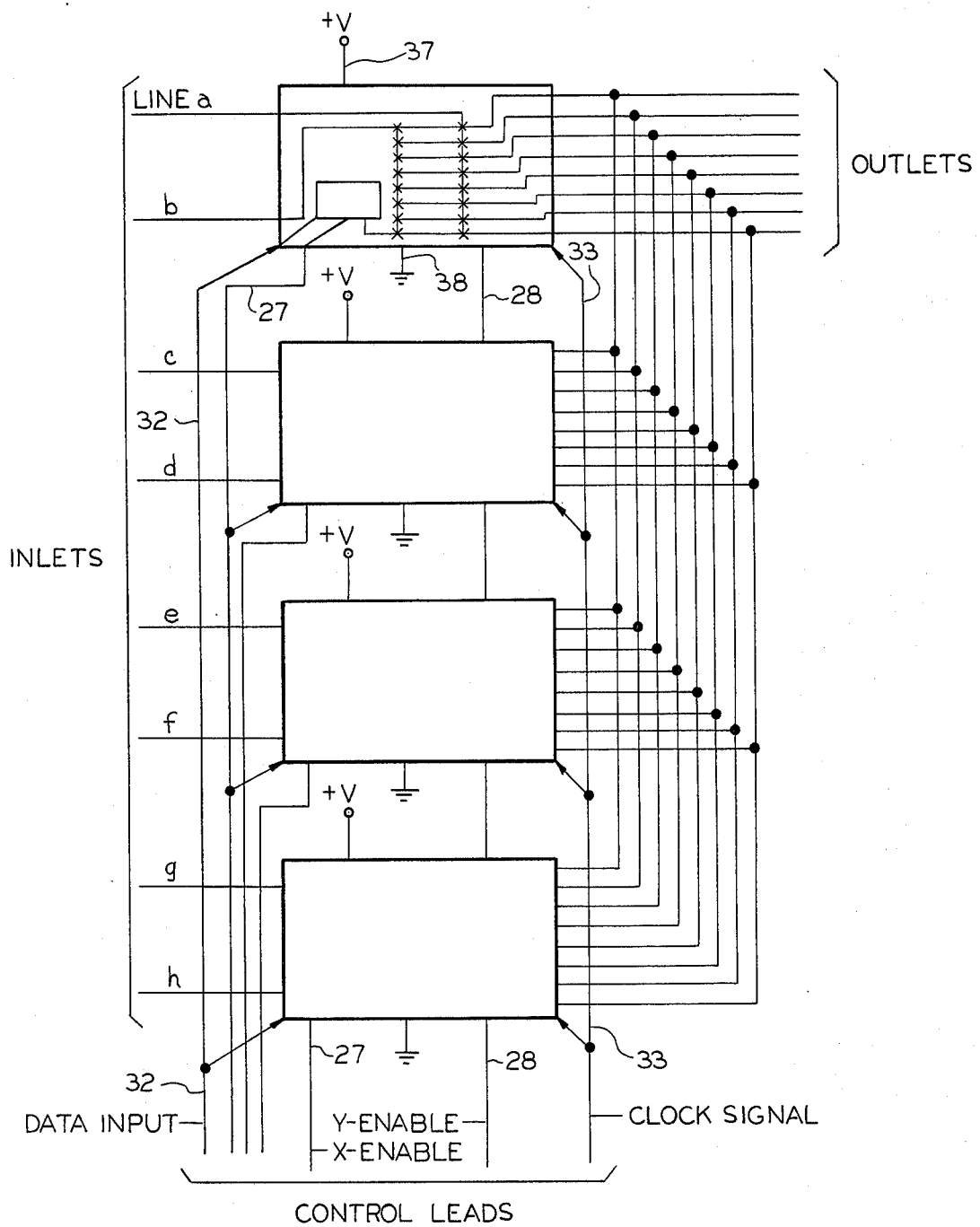

The above mentioned and further related objects and features of the invention will be best understood by making reference to the following drawings, in which:

FIG. 1 is a simplified block diagram of a preferred embodiment of the telephone switching system;

FIG. 2 is a simplified schematic showing the cooperation of the combination line circuit, d-MOS matrix, and trunk circuit with both the line circuit and the trunk circuit having therein a novel two-way amplifier; and FIG. 3 shows the interconnection of the line circuits to the inputs of a plurality of switching arrays and the connection of the output of the switching arrays to provide a typical 8 × 8 path selection system.

FIG. 1 shows a telephone switching system 11 comprising a plurality of telephone subscriber stations 12, of which only two are shown, connected through individual line circuits 13 to a switching matrix 14. The other side of the switching matrix is shown coupled to the usual telephone circuitry, such as: link 16 for interconnecting the individual subscriber stations to each other; trunk circuits 17 for connecting the line to a central office; and register 18 for use in accomplishing the selected connections. As shown in the block diagram, the connections can be switched through either under the control of an attendant, using the attendant control circuit 19 and attendant console 21, to further control micro-processors in the control circuits shown collectively as control circuits 22, or the connections can be switched through unattended. A tone supply circuit is shown in block 23.

The line circuits 13, trunk circuits 17 and attendant control circuit 19 are shown with unique two-way amplifiers, such as the amplifier 24a with feedback circuit 26a shown in line circuit 13a. The two-way amplifiers lower the amplitude of the signals entering the matrices and nonetheless increase the amplitude of the signals going from the matrices to the subscribed stations, trunk and attendant consoles. The increased amplitude compensates for losses occurring in the system.

The control circuits, shown collectively as circuits 22, supply enable signals through conductors 27, and 28, respectively, as well as clock signals and data signals through conductors 32 and 33, respectively. Leads 29 and 31 are transmission paths. The tone supply signals are connected to the matrix through conductors shown as 34 and 36. Conductors 25 and 30 are shown to indicate connections between the control circuits 22 and the circuits interconnected by the switching network. The interaction of signals used in switching through the matrices is discussed in the description of FIG. 3.

In FIG. 2 the line circuit 13a is shown to include means for reducing the amplitude of the signal to the matrix and increasing the signal to the subscriber station. More particularly, the feedback amplifier 24a including the amplitude reducing negative feedback circuit 26a are shown between the telephone subscriber station 12 and the d-MOS matrix 14a. The matrix is shown as connecting the line circuit to the trunk 17. The trunk also has therein means for increasing the amplitude of the signal going to the central office and decreasing the amplitude of the signal going to the matrix. More particularly a two-way amplifier 24b including the negative feedback circuit 26b is shown in the trunk 17.

Positive voltage is shown connected to the matrix through lead 37, and ground is shown connected to the matrix through lead 38. The clock signals are connected to the matrix through lead 33, the data signals are connected to the matrix through lead 32, while the enable signals are connected to the matrix over leads 27 and 28.

The telephone subscriber station 12a is represented by a resistor RL and alternating current generator 39. These are connected to the ring and tip conductors labelled R and T, respectively. The tip and ring conductors are coupled to the opposite sides of the primary windings 41 and 42 of transformer T1. A negative voltage source is shown connected to the subscriber station over a path that includes the negative voltage source -V, resistor R1, winding 41, the ring conductor R, resistor RL, tip conductor T, winding 42 of transformer T1, resistor R2 to ground. Resistors R1 and R2 are current limiting resistors normally used in such a telephone circuit.

Capacitor C1 between windings 41 and 42 provides the alternating current path through the primary of transformer T1. The alternating signals on windings 41 and 42 are inductively coupled to the secondary winding 43 of transformer T1. One side of winding 43 is connected to one input of the d-MOS matrix 14a through conductor 44. The amplitude of the signal on conductor 44 and across winding 43 is controlled by two-way amplifier 24a. The alternating current signal going through winding 43 is coupled to the inverting input of an operational amplifier OA1 through capacitor C2 and resistor R3. The operational amplifier OA1 provides means for amplifying the signal coming from the matrix 14a. When a connection is established between a trunk through the matrix 14a and the telephone line circuit 13a connecting the subscriber station 12a to the matrix, then a positive d.c. voltage is transmitted from the trunk circuit over line 44 through winding 43, resistor R4, resistor R6, resistor R3 to the inverting input of operational amplifier OA1. The d.c. signal is modulated by the previously described a.c. signal.

The output of the operational amplifier is coupled to control a buffer amplifier. More particularly, the output of amplifier OA1 is coupled directly to the base of PNP transistor Q1. The non-inverting input of operational amplifier OA1 is coupled to positive voltage through NPN transistor Q2. Transistor Q2 is switched on responsive to an off hook condition. The base of transistor Q2 is coupled to positive voltage on a circuit that comprises a source of negative voltage, diode D1, PNP transistor Q3 and resistor R8 to positive voltage.

The emitter of transistor Q3 is coupled to the anode of didode D1. The negative voltage source is coupled to the cathode of diode D1. The collector of transistor Q3 is coupled to the side of resistor R8 opposite the positive voltage source. The base of transistor Q3 is coupled to ground through resistor R9.

Transistor Q3 is switched to its non-conducting state, responsive to an off hook condition. Therefore, positive voltage is coupled through resistor R8 and resistor R11 to the base of transistor Q2. Resistor R11 is bridged by diode D5. The collector of transistor Q2 is connected to positive voltage source through resistor R12. The emitter of transistor Q2 is connected directly to positive voltage source V1, that is lower than the voltage V, and also to its base through positive going diode D2. The voltage at the collector of transistor Q2 is clamped to a maximum positive voltage that is less than V, but more than V1, using a clamping circuit which comprises the series diode D3, zener diode Z1 to ground. The junction of diode D3 and zener diode Z1 are coupled cathode to cathode. The coupling point is connected to positive voltage through resistor R13. In a preferred embodiment: V = 15 volts; V1 = 5 volts and the clamped voltage is a maximum of 9 volts. The collector of transistor Q2 is connected to the non-inverting input of operational amplifier OA1 through resistor R14.

Prior to cut through the conductor 44 is coupled to the positive voltage source through winding 43, resistor R4, resistor R7, conductor 46 and resistor R16. The junction of conductor 46 and resistor R7 is coupled to the emitter of buffer amplifier transistor Q1. The non-inverting input of operational amplifier OA1 is connected to the junction of resistors R14 and R16 in the circuit described. The gain of operational amplifier OA1 is controlled by the ratio of resistances R14 and R16.

In order to maximize the signal that can be passed through the matrix, the d.c. voltage on the audio path must be controlled and held to a given label depending on the cross point used. The d.c. level should be at the midpoint of the voltage range which can be coupled through the matrix.

In the preferred embodiment the resistor ratios $$R4/R7 = R14/R16$$

then the d.c. level at conductor 44 is the same as the voltage on the collector of transistor Q2. The voltage on conductor 44 is independent of the d.c. current going through the matrix.

Means are provided for signalling when line circuit 13a is busy. More particularly, negative voltage (−V) is coupled through a circuit that includes zener diode Z2 bridged by resistor R17 and pilot lamp L1 in series to the junction of the collector of transistor Q1 and the negative voltage input of operational amplifier OA1. When the line circuit 13a is busy, then the current flowing through transistor Q1 causes a voltage drop across zener Z2 which in turn activates pilot lamp L1. When the line 13a is not busy, then lamp L1 is not lit. Thus, a lit lamp L1 indicates a busy line. In practice the lamp circuits are common to all of the lines on a given board. Therefore, for example, if each line board has eight lines, the lamp circuit is common to eight lines and lamp L1 will be lit, if any one of the eight lines are busy.

Means are provided for compressing the signal going into matrix 14. More particularly, a negative feedback circuit comprising capacitor C3 in series with resistor R8 is coupled between conductor 44 and the inverting input of operational amplifier OA1. The feedback circuitry 26a of two-way amplifier 24a is such that the amplitude of the signal on conductor 44 is less than the amplitude of the signal across winding 43. Thus, the signal across winding 43 is increased by operational amplifier OA1, and the signal on conductor 44 is decreased.

Dial pulses are transmitted to the matrix, such as matrix 14a, through a circuit that includes a differential level detector DL1. The dial-pulses are coupled to the negative input of differential level detector DL1 through resistor R1, conductor 47 and resistor R19. The positive input of the differential level detector has a reference voltage on it obtained by connecting a negative voltage source through a voltage divider comprising resistors R21 and R22 in series between the negative voltage source and ground. The positive input of level detector DL1 is coupled to the junction of resistors R21 and R22.

Negative voltage is coupled to the differential level detector DL1 over conductor 48. Conductor 49 is coupled to ground through resistor R23. The cathode of clamping zener diode Z3 is coupled to the junction of conductor 49 and resistor R23. The anode of zener Z3 is coupled to the anode of diode D1 whose cathode is coupled to negative voltage. The zener diode Z3 and diode D1 make up a clamping circuit.

The output of differential level detector DL1 is connected to the base of NPN transistor Q3. Dial pulses received over conductor 47 cause NPN transistor Q3 to switch on. When transistor Q3 switches on, then the negative voltage on the emitter of transistor Q3 is placed on the base of transistor Q2 through resistor R11, turning off that transistor, thereby providing a positive going pulse on the non-inverting input of operational amplifier OA1. The positive going pulse is coupled through the operational amplifier OA1, transistor Q1 and transmitted to line 44 and matrix 14a over the circuit that includes resistors R7, R4 and winding 43.

An off-hook condition is transmitted to the control circuit 22 over conductor 25, during the time slot for the line received from conductor 55. The off-hook condition causes transistor Q3 to switch off. The collector of transistor Q3 is coupled through resistor R10 and bus driver amplifier BD1 to conductor 25 to notify the control system 22 of the off-hook condition during the time slot for the time circuit. The control systems then cause a register to be connected through the switching matrix to the off-hook line. Positively directed diode D5 connects resistor R10 to the base of transistor Q2 and the cathode of diode D2 thereby preventing the signal to bus driver BD1 from going too far positive.

Voice signals transmitted through the matrix 14a to the trunk 17 are coupled through matrix outlet conductor 51. Conductor 51 is coupled to two-way amplifier 26b through a speech gate that includes negative going diode D4, capacitor C4, positive going diode D6, to conductor 52. The conductor 52 is coupled to winding 53 of transformer T2. The other side of transformer T2 includes the central office circuit comprising windings 54 and 56 serially connected through capacitor C6. The capacitor C6 is shown bridged by relay K1. Winding 54 is connected to the tip lead, and winding 56 is connected to the ring lead. The central office represented by generator 57 bridged by resistor RL is connected across the tip and ring leads.

The two-way amplifier 24b includes negative feedback means, for diminishing the signal amplitude going to the matrices. More particularly, capacitor C7 in series with resistor R24 is connected from conductor 52 to the inverting input of an operational amplifier OA2. The alternating current signal on conductor 52 is coupled to the inverting input of operational amplifier OA2 over the winding 53, capacitor C8 and resistor R26, and also through the feedback circuit — capacitor C7 and resistor R24. Direct current signals are coupled from conductor 52 to the inverting input of operational amplifier OA2 over winding 53, resistors R27, R29 and R26 in series. The junction of resistors R27 and R29 is coupled to the emitter of transistor Q4 through resistor R28.

Amplifier 24b acts in precisely the same manner as amplifier 24a to exactly reconstitute the signal decreased by amplifier 24a and vice versa.

The output of the operational amplifier OA2 is connected directly to the base of the buffer amplifier PNP transistor Q4 connected an an emitter follower. Thus, a positive voltage on the inverting input of operational amplifier OA2 is a negative voltage on the base of transistor Q4 increasing the current flow through that transistor. Negative voltage $-V$ is coupled directly to the collector of transistor Q4. Negative voltage source $-V1$ provides the negative voltage for operational amplifier OA2. It should be noted that voltage $-V1$ is less negative than voltage $-V$. The non-inverting input of operational amplifier OA2 is supplied with positive voltage through resistor R31 and conductor 59. The junction of resistor R31 and the non-inverting input of amplifier OA2 is also connected through resistor R32, conductor 61, to the junction of resistor R28 and the emitter of transistor Q4.

As the output of operational amplifier OA2 goes positive, the current flow through transistor Q4 decreases and the direct current voltage level at which transformer winding 53 operates becomes more positive. However, alternating current-wise the combination of operational amplifier OA2 and transistor Q4 increases the voltage across winding 53 and accordingly increases the signal going into the trunk. The use of series capacitor C7 and resistor R24 bridging winding 53, capacitor C8 and resistor R26 causes an actual decrease in the absolute voltage on conductor 52 and an increase of the absolute voltage across winding 53.

In a preferred embodiment of the two-way amplifier, such as amplifier 24a, with a 1:1 winding ratio transformer, the following components were used:

Capacitors:
 C2 = 0.22 MF
 C3 = 0.1 MF
Resistors

R3 = 22 K
R4 = 39
R6 = 160
R8 = 22 K
R14 = 10 K
R16 = 41 K

Operational Amplifier:
OA1 — 741

Thus, the two-way amplifier 24b of the trunk circuit 17 actually operates to amplify the signal coming from the matrix to restore it such that the amplitude of the signal going to the central office is compensated for transmission losses. Components resistors R14 and R16 determine the gain of two-way amplifier 24a; while components resistors R31 and R32 determine the gain of two-way amplifier 24b.

Means such as a constant current circuit is connected to the matrix from the trunk side. More particularly, the constant current circuit includes PNP transistor Q6 having its collector coupled to matrix outlet conductor 51 over conductor 62. The emitter of transistor Q6 is coupled to positive voltage through resistor R33. The base of transistor Q6 is clamped to positive voltage through conductor 63 and zener diode Z4. Conductor 63 is coupled to ground through resistor R34. This circuit provides the d.c. current required after switch through.

Means are provided for receiving dial pulses at the trunk circuit. More particularly, dial pulses are received on the trunk side over a circuit that includes differential level detector DL2. The inverting input of the differential level detector DL2 is connected to positive voltage through a voltage divider that includes resistor R36 in series and resistor R37 coupled to ground. Matrix outlet conductor 51 is coupled to the positive or non-inverting input of differential level detector DL2 through resistor R38. The differential level detector detects the signal level differences caused by dial pulses and uses these differences to operate circuit selection means, such as depicted by gate G1 and dial relay K2, for example. It should be understood that the gate and relay are shown only in brief schematic form for illustrative purposes only.

Means are provided to disable the speech gate during the transmission of dial pulses. This means is shown as switch SW1. Switch SW1 represents the logic circuit for controlling the speech gate to bypass capacitor C4, during dialing. When switch SW1 is open, then positive voltage is applied to the bases of the speech gate PNP transistors Q7 and Q8.

Positive voltage is extended to the bases of the transistors Q7 and Q8 over a circuit that extends from positive voltage through resistors R39, R41 to conductor 66, connected to both bases. Clamped positive voltage is also applied to conductor 66 from conductor 63 over conductor 67 and through diode D7.

When switch SW1 is closed, the bases of transistors Q7 and Q8 are moved toward ground and positive voltage is applied to the anodes of both diodes D4 and D6 enabling current to pass therethrough. More particularly, positive voltage is applied to the anode of diode D4 through resistor R40, and transistor Q7. This positive voltage cancels the negative voltage which is continually applied to the anode of diode D4 through resistor R42. The negative voltage blocks diode D4 and the cancelling positive voltage unblocks it. Similarly, diode D6 is normally blocked by the negative voltage applied to its anode through resistor R43. With switch SW1 closed, positive voltage is applied to the anode of diode D6 through resistor R44, and transistor Q8 cancelling the negative voltage and unblocking that diode.

Thus, the trunk circuit provides means for connecting the matrices to central offices responsive to dial pulses or dial tones and means for delivering reduced amplitude signals to the matrices and delivering amplified signals to the central offices.

As shown particularly in FIG. 3, a preferred embodiment of the invention utilizes four 18 × 2 switching matrices to provide for interconnecting 8 lines with 8 outlets. One source of the 8 × 2 switching array is SIGNETICS SD 5301. However, it should be recognized that the inventive system can use any of a great number of switching arrays.

Each of the chips, as shown in FIG. 3, has line circuits connected to each of the two inlets. For example, the topmost switching array is shown having line a and line b permanently coupled to inlets to the array. The array is shown with eight outlets for connecting to links, registers or trunks, as desired. In addition to the lines and the circuitry connected to the outlets each of the chips has a voltage source, such as positive voltage source 37, connected thereto and also has a ground connection, shown as ground connection 38. The chips are each connected to control circuits. From those control circuits there is connected a pair of enable signal conductors, such as enable conductors 27 and 28, as well as data conductor 32 and clock conductor 33. In a preferred embodiment of the invention, each enable signal cooperates with the clock signal to provide a time frame for switching of the individual lines.

The data information received from the control circuits specifies which of the 16 switches should be switched on and which should be switched off during the time frames individual to the two lines connected per chip.

The data, in a preferred embodiment, is in the form of a binary code, wherein 4 bits are used to identify the switch or cross point and 1 bit is used for on or off commands. Therefore, the data is a 5 bit binary code.

In operation a telephone subscriber, such as, for example, subscriber "12a" among the telephone subscriber stations 12, may originate a call by removing the handset from the hook switch. Responsive thereto a circuit is established, as shown in FIG. 2, extending from negative voltage through resistor R1, winding 41 of transformer T1, the telephone set represented by load resistor RL, the tip lead, winding 42 of transformer T1 and resistor R2 to ground. The off-hook condition is detected by differential level detector DL1 which is connected to the junction of resistor R1 and winding 41 through conductor 47 and resistor R19.

The output of differential level detector DL1 is a negative signal which causes transistors Q3 to switch off. The collector of transistor Q3 is coupled through logic circuitry represented by bus driver BD1 to microprocessors in the control circuits 22 over conductor 25, when the time frame related to line "a" causes a signal on the bus driver enable input 55 of the bus driver BD1. More particularly, the collector of transistor Q3 is coupled through a level converter resistor R10 to the input of bus driver BD1.

Responsive to the signal from bus driver BD1, the microprocessor of the control circuit 22 selects a register, such as register 18, which it interconnects with line circuit 12a through the matrix 14a. If a tone dialer, such as a touch tone dial, is used, the dial signals are transmitted through transformer T1. If rotary dials generating dial pulses are used, then the dial pulse signals are transmitted through the dial pulse circuitry including differential level detector DL1, level conversion transistor Q3, which is switched to its conducting state responsive to each of the dial pulses, and transistor Q2, which is switched to its non-conducting state responsive to the operation of transistor Q3.

The switching of transistor Q2 varies the level of the signal to the non-inverting input of operational amplifier OA1. This naturally sends pulses through the matrix to the register. Responsive to the pulses the register selects or operates to cause selection of a trunk circuit, such as trunk circuit 17, and then disconnects.

Further pulses are transmitted through the matrix to the differential level detector DL2 of the trunk circuit. The output of the differential level detector DL2 is transmitted through circuitry known to those skilled in the art and represented by gate circuit G1 connected to dial relay K2. Responsive to the dial pulses, further connections are made through the trunk, for example, to a telephone subscriber connected through the central offices of the trunk.

When the trunk is selected by the register, the microprocessors transmit enable signals and data signals to supervise the switch through of the line circuit to the trunk circuit. The enable signals are connected to each of the lines and select a time frame or portion of the clock signals for performing switching to the particular line. The data signals provide the binary data necessary to control the actual switching of the line circuits to the matrix outlet leads.

A positive constant current is transmitted from the trunk circuit through the matrix to the line circuit. Thus, constant current is transmitted through transistor Q6 to conductor 51, through the matrix, to conductor 44, and to the two-way amplifier 24a. The positive direct current at conductor 44 is transmitted through winding 43 of transformer T1, resistor R4, resistor R7, transistor Q1, lamp L1, and resistor R17 to negative voltage.

The logic circuit represented by switch SW1 operates to close a speech gate during the transmission of the dial pulses. More particularly diodes, such as diode D4 and D6, are blocked by the dial pulses. When the dial pulses are present in the trunk circuit, then the logic circuitry, represented by switch SW1, causes blocking voltage to be applied to the bases of transistors Q7 and Q8. With no current coming through transistors Q7 and Q8, the negative voltages at resistors R42 and R43 block diodes D4 and D6, respectively. This removes capacitor C4 from the circuitry and thereby prevents distortion of dial pulses.

When there are no more dial pulses transmitted, the logic circuitry, as represented by switch SW1, closes to once more enable transistors Q7 and Q8. A constant current flows through transistors Q7 and Q8 unblocking diodes D4 and D6. A voice signal from subscriber "12a" can then be transmitted to transformer T1 to winding 43. The two-way amplifier 26a functions so that the signal amplitude across winding 43 is always greater than the signal on conductor 44, because of the negative feedback characteristics of circuit 26. Thus, even plus 10 dBM voice signals coming from the line circuit through the transformer T1 are reduced by amplifier 24a for transmission through the monolithic chip matrix and voice coming from the matrix are reamplified by amplifier 24a for transmission through transformer T1.

On the trunk side of the matrix the voice signals are transmitted through two-way amplifier 24b. Here again, the signal across winding 53 is greater than the signal on conductor 52, thereby effectively replacing losses which may have ocurred during transmission so that the signal across the winding 53 is equal to the signal across the winding 43. The amplification by the amplifier 24b enables a signal in the order of plus 10 dBM to be received at the central office.

Thus, the combination of the unique two-way amplifier and the monolithic chip switching array enables an efficient and economical telephone switching system.

While the principles of the invention have been described above in connection with specific apparatus and applications, it is to be understood that this description is made by way of example only, and not as a limitation on the scope of the invention.

I claim:

1. A telephone switching system for interconnecting telephone equipment to complete communication paths therebetween, said equipment including subscriber stations, line circuits connected to each of said subscriber stations, switching matrix means to selectively interconnect circuits connected to the inputs and outputs of said switching matrix means, means in said line circuits including line transformers having primary windings on said subscriber station side of said line circuits and secondary windings on said switching matrix side of said line circuits for connecting said line circuits to said switching matrix means, variable impedance means in series with said secondary windings, and amplifier means in said line circuits connected to control the variable impedance means responsive to signals going from said subscriber stations to said switching matrices and from said switching matrices to said subscriber stations for decreasing the amplitude of the signals going to said matrix means, while said amplifier means increases the amplitude of the signals going to said subscriber stations.

2. The switching system of claim 1 wherein said equipment includes central office means, trunk circuits connected to each of said central office means, means connecting said trunk circuits to said switching matrix means for connecting said central offices to other telephone equipment, amplifier means in said trunk circuits to amplify the amplitude of signals going from said switching matrix means to said central office means, and attenuation means connected in said amplifier means for decreasing the amplitude of the signals going from the central office to the matrix means, said line circuit amplifier means and said trunk circuit amplifier means being matched.

3. The telephone switching system of claim 1 wherein said switching matrix means comprises monolithic chips having d-MOS transistor switches therein and controls integral to said chips for controlling said d-MOS transistors.

4. The telephone switching system of claim 1 wherein said attenuation means comprises negative feedback means connected in said amplifier means.

5. A telephone switching system for interconnecting telephone equipment to complete communication paths therebetween,
- said equipment including subscriber stations,
- line circuits connected to each of said subscriber stations,
- switching matrix means operated responsive to control signals received from control circuitry to selectively interconnect said subscriber stations through said line circuits,
- amplifier means in said line circuits for amplifying the amplitude of the signals coming from said matrix means and going to said suscriber stations,
- attenuation means connected in said amplifier means for decreasing the amplitude of the signals going to said matrix means,
- said amplifier means comprising operational amplifier means,
- said line circuits including line transformers,
- inlets on said matrix means for connecting to said line circuits,
- a winding of each of said line transformers connected to at least one of said inlets of said switching matrix means, and
- means for coupling the other side of said line transformer winding to the inverting input of said operational amplifier so that the output of said operational amplifier reinforces the signal from said switching matrix to thereby amplify the signal going to the subscriber station through said transformer.

6. The telephone switching system of claim 5 wherein said attenuation means interconnects the inlet of said switching matrix means to the inverting input of said operational amplifier to thereby diminish the amplitude of the signal going to the inlet of said switching matrix means.

7. The telephone switching system of claim 6 wherein said means for coupling the signal from said inlet to reenforce the amplitude of the signal going into the said subscriber station comprises a winding of said line current transformer.

8. In the system of claim 4 means being provided for determining a d.c. level for operation of the amplifier means, whereby the voice current variations are not distorted when going through the said matrix means.

9. The system of claim 8 wherein means are provided for maintaining the voltage on the inlet to the matrix means independent of the d.c. current going through the matrix.

10. The system of claim 7 wherein the outlets of said matrix means are connected to trunk circuit means;
- wherein the a.c. connection of the inlets of said matrix means to the inverting input of said operational amplifier which causes the signal going to the subscriber station to be amplified includes the winding of the line circuit transformer, first capacitor means, and a first resistor in series; and
- wherein the means coupling the inlet of said matrix means to said inverting input for attenuating the signal going to the switching matrix comprises a second capacitor coupled in series with a second resistor.

11. The system of claim 10 wherein the output of said operational amplifier is coupled to the base of a PNP transistor connected as an emitter follower amplifier.

12. The system of claim 11 wherein the collector of said transistor is coupled to a negative voltage source,
- the emitter of said transistor being coupled through third and fourth resistor means in series to a positive voltage source,
- fifth and sixth resistor means connected in series and coupling the emitter of said transistor to the junction of said first capacitor and said winding of the line transformer,
- seventh resistor means coupling the junction of said fifth and sixth resistor means to the junction of said first capacitor and said first resistor means for forming a d.c. path to the inverting input of said operational amplifier, and
- wherein the ratio of said fifth and sixth resistor means is equal to the ratio of said third and fourth resistor means, whereby the d.c. level at the inlet of said matrix means, is the same as the voltage on the collector of said transistor.

13. An improved telephone switching system for interconnecting telephone circuits,
- switching matrices for performing the switching to do the interconnecting,
- said telephone circuits including subscriber stations,
- line circuits connecting to each of said subscriber stations,
- said line circuits having line circuit transformer means,
- said transformer means having a primary winding on the subscriber side and a secondary winding on said switching matrix side of said line circuits,
- the improvement comprising amplifier means in said line circuits for compressing the amplitude of the signal going to said switching matrices from said telephone circuits and amplifying the signals going from said switching matrices to said telephone circuits,
- said amplifier means comprising operational amplifier means,
- variable impedance means, serially connected with said secondary winding,
- means for connecting said operational amplifier means to control the variable impedance responsive to signals going from said secondary winding to said switching matrix, and
- means for connecting said last named signals to the negative input of said operational amplifier, whereby the amplitude of the signal going to said switching matrix is compressed and the amplitude of the signals going to said subscriber stations is amplified.

* * * * *

UNITED STATES PATENT AND TRADEMARK OFFICE
CERTIFICATE OF CORRECTION

PATENT NO. : 4,087,645
DATED : May 2, 1978
INVENTOR(S) : Alfred Magnus Hestad

It is certified that error appears in the above-identified patent and that said Letters Patent are hereby corrected as shown below:

Col. 3, line 5     "subscribed" should be -- subscriber --
Col. 4, line 16    "didode" should be -- diode --
Col. 6, line 35    "an an" should be -- as an --
Col. 10, line 67   "attenuation" should be -- variable impedance --
Col. 11, line 30   after "matrix" insert -- means --

Signed and Sealed this

Twenty-fourth Day of October 1978

[SEAL]

Attest:

RUTH C. MASON
Attesting Officer

DONALD W. BANNER
Commissioner of Patents and Trademarks